United States Patent
Tian et al.

(10) Patent No.: US 10,323,117 B2
(45) Date of Patent: *Jun. 18, 2019

(54) POLYOLS DERIVED FROM FARNESENE FOR POLYURETHANES

(71) Applicant: Fina Technology, Inc., Houston, TX (US)

(72) Inventors: Nan Tian, Wilmington, DE (US); Herbert Chao, Paoli, PA (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,897

(22) Filed: May 14, 2018

(65) Prior Publication Data

US 2018/0258214 A1 Sep. 13, 2018

Related U.S. Application Data

(62) Division of application No. 14/989,140, filed on Jan. 6, 2016, now Pat. No. 9,994,669.

(51) Int. Cl.
| | |
|---|---|
| C08G 18/62 | (2006.01) |
| C08F 36/22 | (2006.01) |
| C08F 136/22 | (2006.01) |
| C08F 236/22 | (2006.01) |
| C08G 18/69 | (2006.01) |
| C08G 18/76 | (2006.01) |
| C08G 18/65 | (2006.01) |
| C08G 18/12 | (2006.01) |
| C09D 175/14 | (2006.01) |
| C08G 18/32 | (2006.01) |
| C09J 175/14 | (2006.01) |
| C09D 13/00 | (2006.01) |
| C09K 3/10 | (2006.01) |
| C08G 101/00 | (2006.01) |

(52) U.S. Cl.
CPC .......... *C08G 18/6204* (2013.01); *C08F 36/22* (2013.01); *C08F 136/22* (2013.01); *C08F 236/22* (2013.01); *C08G 18/12* (2013.01); *C08G 18/3206* (2013.01); *C08G 18/6208* (2013.01); *C08G 18/6588* (2013.01); *C08G 18/69* (2013.01); *C08G 18/698* (2013.01); *C08G 18/7671* (2013.01); *C09D 13/00* (2013.01); *C09D 175/14* (2013.01); *C09J 175/14* (2013.01); *C09K 3/1021* (2013.01); *C08F 2810/40* (2013.01); *C08G 2101/00* (2013.01); *C08G 2150/00* (2013.01); *C08G 2170/00* (2013.01)

(58) Field of Classification Search
None
See application file for complete search history.

(56) References Cited

U.S. PATENT DOCUMENTS

| | | | |
|---|---|---|---|
| 4,063,002 A | 12/1977 | Wilson, Jr. | |
| 5,589,543 A | 12/1996 | Yokelson et al. | |
| 5,925,724 A | 7/1999 | Cenens et al. | |
| 6,060,560 A | 5/2000 | St. Clair | |
| 6,211,324 B1 | 4/2001 | Haider et al. | |
| 9,994,669 B2 | 6/2018 | Tian et al. | |
| 2004/0158003 A1* | 8/2004 | Ruckel | B01F 17/0028 525/333.3 |
| 2011/0151154 A1 | 6/2011 | Landon | |
| 2012/0165474 A1 | 6/2012 | Mcphee et al. | |
| 2013/0123379 A1 | 5/2013 | Mcphee et al. | |
| 2016/0272750 A1 | 9/2016 | Voci et al. | |
| 2016/0376386 A1 | 12/2016 | Yoo et al. | |

FOREIGN PATENT DOCUMENTS

| | | |
|---|---|---|
| EP | 1279687 A2 | 1/2003 |
| EP | 2899255 A1 | 7/2015 |
| KR | 20150135305 A | 12/2015 |
| WO | 2012018682 A1 | 2/2012 |

OTHER PUBLICATIONS

Non Final Office Action for U.S. Appl. No. 15/477,699, dated Sep. 13, 2018, 36 pages.
Cray Valley Products for Urethane Elastomers Hydroxyl Terminated Functional Liquid Poly bd® Resins, 24 pages (2011).
International Search Report and Written Opinion for International Application No. PCT/US2016/046519, dated May 17, 2017—20 pages.
Invitation to Pay Additional Fees for International Application No. PCT/US2016/046519, dated Nov. 11, 2016—11 pages.
International Preliminary Report on Patentability for International Application No. PCT/US2016/046519, dated Jul. 10, 2018, 12 pages
Entire patent prosecution history of U.S. Appl. No. 14/989,140, filed Jan. 6, 2016, entitled, "Polyols Derived From Farnesene for Polyurethanes," now U.S. Pat. No. 9,994,669, issued Jun. 12, 2018.
International Search Report and Written Opinion for International Application No. PCT/US2018/024525, dated Jul. 4, 2018, 13 pages.

* cited by examiner

*Primary Examiner* — Michael M Dollinger
(74) *Attorney, Agent, or Firm* — Albert Shung

(57) ABSTRACT

A composition is provided for making a polyurethane that may be incorporated in various products, such as a sealant, a coating, a caulk, an electric potting compound, a membrane, a sponge, a foam, an adhesives, and a propellant binder. The composition includes one or more polyols, one or more isocyanate-group containing compounds having an isocyanate group functionality of at least two, and optionally one or more chain extenders. At least one of the polyols is a farnesene-based polyol having a number average molecular weight less than or equal to 100,000 g/mol and a viscosity at 25° C. less than 10,000 cP. The farnesene-based polyol may be a homopolymer or a copolymer of farnesene. The composition may also comprise additional polyols, such as a polyol of a homopolymer or copolymer of a polydiene. Methods of preparing a polyurethane are also provided.

15 Claims, No Drawings

POLYOLS DERIVED FROM FARNESENE FOR POLYURETHANES

CROSS-REFERENCE TO RELATED APPLICATIONS

This application is a divisional of U.S. patent application Ser. No. 14/989,140, filed on Jan. 6, 2016, which are incorporated herein by reference in its entirety for all purposes.

FIELD OF THE INVENTION

The invention relates to polyurethanes that may be used as insulating glass sealants, electric potting compounds, construction coating/sealants, and water membranes, for example. More specifically, the invention relates to polyurethanes and their compositions that are derived or include polyols derived from farnesene.

BACKGROUND

It is well known to prepare isocyanate terminated polyurethane prepolymers from polyether and/or polyester polyols and aromatic diisocyanates. Polyurethane prepolymers are formed by combining an excess of diisocyanate with polyol. One of the —NCO groups of a diisocyanate reacts with one of the OH groups of the polyol, and the other end of the polyol reacts with another diisocyanate. The result is a prepolymer having an isocyanate group on both ends. The prepolymer is therefore a diisocyanate itself, but unlike the original diisocyanate, the prepolymer has a greater molecular weight, a higher viscosity, a lower isocyanate content by weight (% NCO), and a lower vapor pressure.

Furthermore, it is also well known to prepare polyurethane elastomers by chain extending these prepolymers with low molecular weight diols. The resulting polyurethanes have excellent mechanical properties, but are rather hydrophilic, which can limit their utility in certain moisture sensitive applications.

Hydroxyl terminated polyols with very non-polar backbones (e.g., hydroxyl functional polybutadiene) can be used to introduce hydrophobicity into polyurethane elastomers. However, polyols having a polybutadiene backbone, for example, usually have a much higher viscosity than those based on polyether backbone. To reduce the viscosity of hydroxyl-terminated polybutadienes, one can either blend polyether polyols into the polyol mixture or make prepolymers with increased —NCO percentage. The approach is in general not ideal because the final polyurethane products tend to have inferior hydrophobicity.

Thus, there is a need for improved polyurethanes having relatively low viscosity for easier application that are hydrophobic for moisture-sensitive applications.

SUMMARY OF THE INVENTION

According to one embodiment, a composition is provided for making a polyurethane. The composition comprises one or more polyols, one or more isocyanate-group containing compounds having an isocyanate group functionality of at least two, and optionally one or more chain extenders. At least one of the polyols is a farnesene-based polyol having a number average molecular weight less than or equal to 100,000 g/mol, more desirably a number average molecular weight less than or equal to 25,000 g/mol, and a viscosity at 25° C. less than 10,000 cP. The farnesene-based polyol may be a polyol of a farnesene homopolymer or a copolymer of farnesene and, optionally, one or more dienes and/or vinyl aromatics. Examples of dienes include butadiene and isoprene. The chain extender may include one or more monomeric polyols and/or polyamines. The composition may also comprise additional polyols, such as a polyol of a homopolymer or copolymer of a polydiene. The NCO/OH ratio of the composition may be about 2:1 to 1:2.

According to another embodiment, a method of preparing a polyurethane is provided comprising combining one or more polyols with one or more isocyanate-containing compounds having a isocyanate functionality of at least two, and optionally, a chain extender, to form a mixture and curing the mixture. At least one of the one or more polyols is a farnesene-based polyol. The chain extender may be one or more monomeric polyols and/or polyamines, such as 1,4-butanediol, 1,6-hexanediol, ethylene glycol, 2-ethyl-1,3-hexanediol (EHD), 2-butyl-2-ethyl-1,3-propanediol (BEPG), 2,2,4-trimethyl-1,3-pentanediol (TMPD), 2,4-diethyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMGDAB), 4,4'-methylene-bis(3-chloro-2,6-diethylaniline) (M-CDEA), and N,N'-bis(sec-butyl) methylene-dianiline (SBMDA). The one or more isocyanate-group containing compounds include 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and combinations thereof.

According to yet another embodiment, a polyurethane is provided prepared according to the methods disclosed herein. An elastomeric product is also provided comprising the polyurethane that may be in the form of a sealant, a coating, a caulk, an electric potting compound, a membrane, a sponge, a foam, an adhesives, and a propellant binder.

These and other aspects of the various embodiments of the disclosed methods and compositions will be understood from the following detailed description.

DETAILED DESCRIPTION OF THE INVENTION

According to various embodiments of the disclosed methods and compositions, a farnesene-based polyol is provided, as well as a composition for making a polyurethane comprising a diisocyanate and the farnesene-based polyol. The composition may further include chain extenders, such as monomeric polyols and polyamines. Therefore, as used herein "polyurethane" refers to a polymer containing one or more urethane bonds and may also include one or more urea bonds.

The farnesene-based polyols according to the disclosed methods and compositions exhibit lower viscosities compared to polydiene-based polyols, such as polybutadiene, of similar molecular weight. Therefore, farnesene-based polyols may be handled favorably in polyurethane formulations and applications without significant dilution with other components. In addition, the farnesene-based polyols can be combined with oligomers based on hydroxyl-terminated polybutadiene and polyisoprene to provide polyol mixtures that may be combined with one or more diisocyanates to form the compositions for making the polyurethanes. The viscosity of polyfarnesene may be controlled by copolymerization with other monomers, such as dienes and vinyl aromatics. Examples include butadiene, isoprene, and styrene. The resulting polyurethanes derived from polyfarnesene polyols, having excellent hydrophobicity, are excellent in a variety of applications, such as insulating glass sealants, caulks, electric potting compounds, construction coating/sealants, water membranes, sponges, foams, adhesives, coatings, propellant binders, encapsulating compounds, as well as other rubber-fabricated materials.

The farnesene-based polyol may be obtained by polymerizing a monomer feed that primarily includes farnesene followed by hydroxyl-functionalization of the terminal end(s) of the polymer. As used herein "polyol" is an organic compound having more than one hydroxyl group. The farnesene-based polymers have a lower viscosity compared to polybutadienes, but comparable hydrophobicity. Therefore, the polyols may be used to manufacture polyurethanes used in moisture sensitive coating applications, for example, without significant dilution with other additives for the purpose of lowering its viscosity.

Any methods known by those having skill in the art may be used to polymerize the farnesene monomers. Anionic polymerization may be desirable because anionic polymerization allows greater control over the final molecular weight of the polymer. The living terminal ends of the polymer may also be easily quenched using an epoxide followed by contact with a protic source providing a polyol. The low viscosity farnesene-based polymers may be derived by polymerizing farnesene monomer alone or with at least one other monomer, such as butadiene or isoprene, for example. It is preferred that the polymers made according to various embodiments of the disclosed methods and compositions are derived from a monomer feed that is primarily composed of farnesene.

Farnesene exists in isomer forms, such as α-farnesene ((E,E)-3,7,11-trimethyl-1,3,6,10-dodecatetraene) and β-farnesene (7,11-dimethyl-3-methylene-1,6,10-dodecatriene). As used in the specification and in the claims, "farnesene" means (E)-β-farnesene having the following structure:

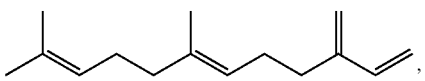

as well (E)-β-farnesene in which one or more hydrogen atoms have been replaced by another atom or group of atoms (i.e. substituted).

The farnesene monomer used to produce various embodiments of the polymer according to the disclosed methods and compositions may be prepared by chemical synthesis from petroleum resources, extracted from insects, such as Aphididae, or plants. Therefore, an advantage of the disclosed methods and compositions is that the polymer may be derived from a monomer obtained via a renewable resource. The monomer may be prepared by culturing a microorganism using a carbon source derived from a saccharide. The farnesene-based polymer according to the disclosed methods and compositions may be efficiently prepared from the farnesene monomer obtained via these sources.

The saccharide used may be any of monosaccharides, disaccharides, and polysaccharides, or may be a combination thereof. Examples of monosaccharides include, without limitation, glucose, galactose, mannose, fructose, and ribose. Examples of disaccharides include, without limitation, sucrose, lactose, maltose, trehalose, and cellobiose. Examples of polysaccharides include, without limitation, starch, glycogen, and cellulose.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and may be a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

The farnesene-based polymers described herein may be prepared by a continuous solution polymerization process wherein an initiator, monomers, and a suitable solvent are continuously added to a reactor vessel to form the desired homo-polymer or co-polymer. Alternatively, the farnesene-based polymers may be prepared by a batch process in which all of the initiator, monomers, and solvent are combined in the reactor together substantially simultaneously. Alternatively, the farnesene-based polymers may be prepared by a semi-batch process in which all of the initiator and solvent are combined in the reactor together before a monomer feed is continuously metered into the reactor.

Preferred initiators for providing a polymer with living terminal chain ends include, but are not limited to organic salts of alkali metals. The polymerization reaction temperature of the mixture in the reactor vessel may be maintained at a temperature of about −80 to 80° C.

As understood by those having skill in the art, anionic polymerization may continue, as long as monomer is fed to the reaction. The farnesene-based polyols may be obtained by polymerization of farnesene and one or more comonomers. Examples of comonomers include, but are not limited to, dienes, such as butadiene, isoprene, and myrcene, or vinyl aromatics, such as styrene and alpha methyl styrene, in which butadiene, isoprene, and styrene are preferred. In one embodiment of the disclosed methods and compositions, a method of manufacturing a farnesene-based polyol may comprise polymerizing a monomer feed, wherein the monomer feed comprises farnesene monomer and a comonomer in which the comonomer content of the monomer feed is ≤75 mol. %, alternatively ≤50 mol. %, or alternatively ≤25 mol. %, based on the total moles of the monomer in the monomer feed. Examples of comonomers include, but are not limited to, dienes, vinyl aromatics, and combinations thereof.

The hydroxy functionalized low viscosity farnesene-based homo-polymers or co-polymers according to embodiments of the disclosed methods and compositions may have a number average molecular weight less than or equal to 100,000 g/mol, alternatively less than or equal to 25,000 g/mol, as measured through a gel permeation chromatograph and converted using polystyrene calibration. The weight of the polyol can be from about 0.5 wt. % to about 99.5 wt. % of the resulting polyurethane. The farnesene-based homopolymers or copolymers may have a viscosity less than or equal to 100,000 cP, alternatively less than 50,000 cP, or alternatively less than or equal to 25,000 cP, at 25° C.

The quenching step to end polymerization is accomplished by reacting the a living terminal end(s) of the living polymer with an alkylene oxide, such as propylene oxide, and a protic source, such as an acid, resulting in a diol or polyol, i.e. a hydroxyl group on the terminal ends of the polymer.

Following polymerization, the hydroxyl-terminated polymer may be hydrogenated to decrease the degree of unsaturation of the polymer to at most 50%, alternatively at most 10%. Hydrogenation of the hydroxyl-terminated polymer will modify the glass transition temperature (Tg) of the polymer and improve the thermostability and UV-stability of the polymer. Hydrogenation may be carried out by a variety of processes familiar to those of ordinary skill in the art including, but not limited to, hydrogenation in the presence of catalysts, such as Raney Nickel, nobel metals, soluble transition metal catalysts, and titanium catalysts, for example. Degree of unsaturation is determined by analytical methods known in the art, such as iodine value.

According to certain embodiments, a composition for making a polyurethane is provided that comprises one or more polyols, wherein at least one polyol is a farnesene-based polyol, one or more isocyanate-group containing compounds having a functionality of at least 2, and optionally, a chain extender selected from the group consisting of monomeric polyols, polyamines, and combinations thereof. The amount of at least one polyol and one or more isocyanate-group containing compounds in the composition may be such that the ratio of —NCO groups to —OH groups is about 2:1 to 1:2. The use of NCO/OH ratios lower than unity results in softer, lower modulus materials. At NCO/OH ratio levels above 1.0 lower modulus material may also be prepared. However, these materials will gradually increase in hardness with time since the free NCO groups can undergo further reaction with moisture to give urea structures, or can form allophanate crosslinks (especially at elevated temperatures).

The physical properties of the polyurethane, such as viscosity, may be tailored depending on the desired application for the polyurethane by selection of the molecular weight of the polyols, as well as the ratio of farnesene-based polyols to non-farnesene-based polyols in the compositions described herein. Additional polyols that may also be included in the composition with the farnesene-based polyol include, but are not limited to, poly(oxypropylene)glycol, poly(oxyethylene)glycol, poly(oxypropylene-oxyethylene) glycol, poly(oxytetramethylene)glycol, poly(oxybutylene) glycol, poly(caprolactone)glycol, poly(ethyleneadipate)glycol, poly(butyleneadipate)glycol, aromatic polyester glycols, polybutadiene polyol, hydrogenated polybutadiene polyol, polyisoprene polyol, hydrogenated polyisoprene polyol, and mixtures thereof.

The one or more isocyanate-group containing compounds having a functionality of at least 2 may exhibit several or all of the following characteristics: bulk, symmetry around the isocyanate functional groups, rigid, aromatic, crystalline and high purity. The one or more isocyanate-group containing compounds having a functionality of at least 2 include, but are not limited to, 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and mixtures thereof.

The one or more chain extenders included in the composition may include monomeric polyols and polyamines, for example. The molecular weight of each of the one or more chain extenders may be about 50 to 700. As understood by those of skill in the art, the type and amount of chain extender will affect the elastomeric properties of the polyurethane, such as tensile strength, elongation, and tear resistance values. When the compositions as described herein react to form a polyurethane, the chain extenders contribute to the hard segment of the polyurethane that serve as physical cross-links between the amorphous soft segment domains. The hard segments, which are formed by the reaction between an isocyanate group and either the hydroxyl or amine group of the chain extenders, inhibit plastic flow of softer segments of the polyurethane provided by the long chain polyols. The choice and amount of chain extender may also affect flexural, heat, and chemical resistance properties of the polyurethane. The chain extenders may include, but are not limited to, 1,4-butanediol, 1,6-hexanediol, ethylene glycol, 2-ethyl-1,3-hexanediol (EHD), 2-butyl-2-ethyl-1,3-propanediol (BEPG), 2,2,4-trimethyl-1,3-pentanediol (TMPD), 2,4-deithyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMGDAB), 4,4'-methylene-bis(3-chloro-2,6-diethylaniline) (M-CDEA), N,N'-bis(sec-butyl)methylene-dianiline (SBMDA), and mixtures thereof.

The polyurethanes made according to the methods disclosed herein may be manufactured by a batch procedure or a continuous procedure. The mixing of the reactants can be accomplished by any of the procedures and apparatus conventional in the art. The individual components are urethane grade and, as such, have low moisture content or are rendered substantially free from the presence of water using conventional procedures, for example, by azeotropic distillation, or by heating under reduced pressure at a temperature in excess of the boiling point of water at the pressure employed. The later procedure is desirable to accomplish degassing of the components.

Preparation of polyurethanes according to the various embodiments disclosed herein may be achieved by procedures conventional in the art for synthesis of polyurethanes. Such procedures include the casting procedure in which the reactants (one or more polyols, one or more diisocyanates, and one or more optional chain extenders) are mixed in the liquid state, either by the one-shot route or the two-step route, also known as the prepolymer technique, and then, the reacting mixture is fabricated into its final form by an appropriate technique such as casting or molding, while the reaction continues by chain extension and/or cross-linking. Final cure is typically achieved by a hot air post-cure for up to twenty-four hours at 25° C. to about 200° C. In general, the reaction of the components limits the subsequent pot life to several minutes, and subsequent casting or molding immediately thereafter. Vacuum degassing may also be used to prepare castings which are bubble free. In the one-shot route, the polyurethane is made by combining all of the components of the composition for making a polyurethane as described herein generally simultaneously into a common reaction vessel. One-shot systems offer the advantages of versatility, simplicity, and low cost fabrication techniques for preparing urethanes having a wide range of physical properties. Such applications as caulks, sealants, elastomers and foams are possible via these systems.

Two-shot systems are based upon the intermediate formulation of a prepolymer which can be further chain-extended with additional polyols and polyamines to form the final polyurethane. These systems may provide higher performance urethanes and have the advantages of lowering the overall toxicity of the system.

In the prepolymer procedure, the one or more isocyanate-group containing compounds are first reacted with the one or more polyols to form a prepolymer. The one or more polyols include at least one farnesene-based polyol. Therefore, the resulting prepolymer is a polymer having a chain derived from farnesene monomer and terminal ends functionalized with one or more isocyanate groups. Additional isocyanate-group containing compounds, polyols, and chain extenders may then be added to the prepolymer to complete formation of the polyurethane.

The methods described herein may be either solventless or include a solvent. In the solventless embodiment, the one or more polyols are heated to 70° to 100° C., for example, and then thoroughly mixed with the desired amount of chain extender for at least two hours under nitrogen flow to eliminate moisture. Isocyanate containing compounds are then added to the mixture immediately prior to pouring the mixture into a heated mold, desirably treated with a mold release compound. The polyurethane composition is formed by curing into the mold for several hours and then postcuring above 110° C. for at least 2 hours. In the solvent method, the one or more polyols are dissolved in a solvent, such as dry toluene, heated to about 70° to 100° C., for example, and then mixed with the desired type and amount of the one or more isocyanate-containing compounds and chain extenders for at least 2 hours under nitrogen flow. The solvent is then removed by evaporation, for example, and then the composition is postcured for at least 2 hours at 110° C. while under vacuum. The thermoplastic polyurethane composition can then be heat pressed above the elastomer melting point to form an elastomeric polyurethane article.

The compositions for making a polyurethane, in addition to including one or more polyols, isocyanate-containing compounds, and chain extenders may also include reinforcing additives, asphalt, and process oils to alter the physical characteristics of the polyurethane composition and/or reduce costs.

Plasticizers may be included as extenders that also increase the softness and flexibility of the cured material in various embodiments of the disclosed methods and compositions. One or more plasticizers may be selected from the group consisting of vegetable oil, mineral oil, soybean oil, terpene resins, aromatic esters (e.g. dioctyl phthalate, diundecyl phthalate, tricresyl phosphate, and triisononyl mellitate), linear esters (e.g. di-tridecyl adipate), chlorinated Paraffin, aromatic and napthenic process oils, alkyl naphthalenes, and low molecular weight polyisoprene, polybutadiene, or polybutylene resins. The amounts of plasticizer employed in the invention composition can vary from 0 to about 500 phr (per hundred parts of polyurethane), between about 0 to about 100 phr, and most between about 0 and about 60 phr.

Because of their hydrocarbon backbones, the polyurethanes made according to the methods and compositions described herein are compatible with conventional hydrocarbon oils, chlorinated oils, asphalts and other related low cost extending materials. The quantity of asphalt or process oil which may be incorporated depends on the type of oils, the amount of isocyanate groups present, and the type of fillers, if present. Cured polyurethanes may be formulated which incorporate in excess of 100 parts extending material per 100 parts of polyurethane and do not "bleed" oil from the final product. The cured polyurethanes may also exhibit a moderate decrease in tensile strength and modulus and improved elongation with the addition of an extending material. Oil extension may also improve hydrolytic stability, control of premix viscosities, pot life, gel time, cure time, and the ability to attain higher filler loading. The use of materials such as chlorinated waxes and oils also provides fire retardant properties to the finished product.

Suitable fillers include, but are not limited to, carbon black, calcium carbonate, clays, talcs, zinc oxide, titanium dioxide, silica and the like. Calcium carbonates are relatively soft and may be used at rather high levels to enhance the extrusion properties of the polyurethane compositions described herein. Elastomers prepared using calcium carbonates are suitable for many caulk and sealant applications where high elongation and moderate tensile properties are required. Clays may provide a moderate degree of reinforcement, fair abrasion resistance, but a relatively high stiffening effect. Clays are used as fillers in stocks requiring hardness and high modulus; e.g., shoe soles and heels, mats, and floor tiles. Zinc oxide may also provide resilience and heat conductivity, but its use as a reinforcing filler may be limited due to high density and cost. Zinc oxide may be effectively employed as a reinforcing filler in conjunction with carbon black to increase tensile, modulus, tear, and hardness, and abrasion resistance. It is important to note that at a constant carbon black level, increasing the concentration of zinc oxide may decrease the workable pot life of the compositions described herein after the isocyanate component is added; i.e., gelation occurs more rapidly. Silicas contribute a greater increase in tensile strength than other non-carbon black fillers. Silicas also have a profound stiffening effect on the compositions described herein. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the isocyanate-containing compounds and the one or more polyols.

Stabilizers known in the art may also be incorporated into the composition. For example, adhesive formulations that utilize the polyurethanes of the disclosed methods and compositions may include stabilizers for protection during the life of the sealant or adhesive against, for example, oxygen, ozone and ultra-violet radiation. The stabilizers may also prevent thermo-oxidative degradation during elevated temperature processing. Antioxidants and UV inhibitors which interfere with the urethane curing reaction should be avoided. Preferred antioxidants are sterically hindered phenolic compounds, like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. However depending on the intended use of the polyurethane, the stabilizer concentration may be as much as about 10 phr.

The polyurethane according to the embodiments of the disclosed methods and compositions may be cured by procedures known by those having ordinary skill in the art for the curing of isocyanate terminated polymers. Curing mechanisms include, but are not limited to, the use of moisture, blocked amines, oxazolidines, epoxies, triisocyanurate ring formation, allophonate and biruet crosslinking and the like. Unfilled urethane systems may be cured at ambient temperatures, but cure rates may be accelerated by using either typical urethane catalysts and/or elevated temperatures. Catalysts include, but are not limited to, dibutyltin dilaurate and 1,4-diazo [2.2.2] bicyclooctane. The amount and type of catalyst that may be included in the compositions described herein may be selected based on the desired cure rate. Dependent upon the curing technology employed, the resulting polyurethanes may be either a thermoset polyurethane or a higher melt temperature thermoplastic polyurethane once curing is accomplished.

The polyurethanes obtained according to the various embodiments of the disclosed methods and compositions exhibit excellent chemical and physical properties.

EXAMPLES

Embodiments of the disclosed methods and compositions are further described using the following non-limiting examples.

Table 1 provides a list of the materials used for preparing the formulations of the following examples and comparative examples.

TABLE 1

| Material | Description | Eq. Wt |
|---|---|---|
| Krasol ® LBH 2000 LO (polybutadiene diol) | 0.812 meq/g OH value (27-74) | 1232 |
| Krasol ® HLBH P-2000 (hydrogenated polybutadiene diol) | 0.83 meq/g OH value | |
| Poly bd ® R45-HTLO (polybutadiene diol) | 0.84 meq/g OH value | |
| Polyfarnesene diol (Mw = 2000) | 1.019 meq/g OH value (27-74) | 981 |
| 2-ethyl-1,3-hexanediol | EHD, | 73.12 |
| 2,4' Diphenylmethane Diisocyanate (Lupranate ® MI) | 33.5% NCO content | 125.4 |
| Dibutyltin dilaurate | T-12 | |
| Dibutyl phthalate | DBP | |

Evaluation of Effect of Polyol Blends and Isocyanate Content

The effect of blending a polyfarnesene diol and polybutadiene diol and reacting the various blends with increasing amounts of a diisocyanate were evaluated. In Comparative Examples 1-3, only polybutadiene diols was used. In Examples 1-6, blends of polybutadiene diol and polyfarnese diols were used. Viscosity of the polyurethane prepolymers was measured at 25° C., and NCO group content was monitored by identifying the intensity of NCO group absorbance peaks at 2265 cm$^{-1}$ on IR during prepolymer preparation at 60° C. for 3 hours. The results are provided in Tables 2, 3, and 4.

TABLE 2

| | Comp. Ex. 1 | Ex. 1 | Ex. 2 |
|---|---|---|---|
| Krasol ® LBH 2000 LO | 100 | 75 | 50 |
| Polyfarnesene diol | 0 | 25 | 50 |
| 2,4' Diphenylmethane Diisocyanate | 19.95 | 20.09 | 20.24 |
| Free NCO % in final prepolymer by wt % | 2.72 | 2.58 | 2.43 |
| Viscosity of prepolymer at 25° C., cps | | | |
| At initial time of prepolymerization | 3437 | 2230 | 1398 |
| At reacted 3 hrs of polymerization | Off scale | 241000 | 131000 |
| NCO content from intensity at 2265/cm on FTIR | | | |
| At initial time of prepolymerization | 0.1978 | 0.2074 | 0.2137 |
| At reacted 3 hrs of polymerization | 0.0950 | 0.0927 | 0.0911 |

TABLE 3

| | Comp. Ex. 2 | Ex. 3 | Ex. 4 |
|---|---|---|---|
| Krasol ® LBH 2000 LO | 100 | 75 | 50 |
| Polyfarnesene diol | 0 | 25 | 50 |
| 2,4' Diphenylmethane Diisocyanate | 31.49 | 31.63 | 31.79 |
| Free NCO % in final prepolymer by wt % | 5.42 | 5.28 | 5.15 |
| Viscosity of prepolymer at 25° C., cps | | | |
| At initial time of prepolymerization | 2007 | 1299 | 870 |
| At reacted 3 hrs of polymerization | 69360 | 39492 | 22620 |
| NCO content from intensity at 2265/cm on FTIR | | | |
| At initial time of prepolymerization | 0.2976 | 0.2962 | 0.2982 |
| At reacted 3 hrs of polymerization | 0.2001 | 0.1985 | 0.1969 |

TABLE 4

| | Comp. Ex. 3 | Ex. 5 | Ex. 6 |
|---|---|---|---|
| Krasol ® LBH 2000 LO | 100 | 75 | 50 |
| Polyfarnesene diol | 0 | 25 | 50 |
| 2,4' Diphenylmethane Diisocyanate | 46.19 | 46.33 | 46.48 |
| Free NCO % in final prepolymer by wt % | 8.24 | 8.12 | 7.99 |
| Viscosity of prepolymer at 25° C., cps | | | |
| At initial time of prepolymerization | 1119 | 721 | 545 |
| At reacted 3 hrs of polymerization | 19371 | 10685 | 7264 |
| NCO content from intensity at 2265/cm on FTIR | | | |
| At initial time of prepolymerization | 0.3821 | 0.3827 | 0.3852 |
| At reacted 3 hrs of polymerization | 0.3048 | 0.3057 | 0.3063 |

Based on the results in Tables 2-4, increased polyfarnesene diol in the polyol blends resulted in a lower viscosity of the resulting polyurethane prepolymer.

Similar viscosity results, provided in Tables 5, 6, and 7 were exhibited by various blends of polyfarnesene diols with polybutadiene diols. The viscosity of the blends decreases with the increased amount of polyfarnesene diol in the blends.

TABLE 5

| Polyfarnesene diol | | 100 | 75 | 50 | 25 | 0 |
|---|---|---|---|---|---|---|
| Polybd R45HTLO | | 0 | 25 | 50 | 75 | 100 |
| Brookfield viscosity, cps | 25° C. | 1289 | 1828 | 2757 | 4187 | 6467 |
| | 40° C. | 427 | 666 | 1060 | 1687 | 2663 |
| | 60° C. | 142 | 236 | 398 | 652 | 1045 |
| | | | miscible | miscible | miscible | |

TABLE 6

| Polyfarnesene diol | | 100 | 75 | 50 | 25 | 0 |
|---|---|---|---|---|---|---|
| Krasol LBH 2000 | | 0 | 25 | 50 | 75 | 100 |
| Brookfield viscosity, cps | 25° C. | 1289 | 2128 | 3609 | 6186 | 10623 |
| | 40° C. | 427 | 668 | 1035 | 1629 | 2605 |
| | 60° C. | 142 | 205 | 299 | 434 | 631 |
| | | | miscible | miscible | miscible | |

TABLE 7

| Polyfarnesene diol | | 100 | 75 | 50 | 25 | 0 |
|---|---|---|---|---|---|---|
| Krasol HLBH 2000 | | 0 | 25 | 50 | 75 | 100 |
| Brookfield viscosity, cps | 25° C. | 1289 | 2820 | 6452 | 15216 | 36492 |
| | 40° C. | 427 | 863 | 1804 | 3819 | 8748 |
| | 60° C. | 142 | 254 | 473 | 892 | 1831 |
| | | | miscible | miscible | miscible | |

Evaluation of Physical Properties

The polyfarnesene diol (Mw=2000) was used, either by itself or blended with polybutadiene polyol, to prepare various samples of cured polyurethane plaques for evaluation. The polyurethanes were prepared from blends that also used various concentrations of a chain extender, ethyl hexanediol (EHD), and a diisocyanate 2,4' Diphenylmethane Diisocyanate (Lupranate® MI).

The polyurethanes were prepared by the one shot procedure. Polyols and chain extenders were combined in a flask and mixed under nitrogen at ambient temperature followed by the addition of isocyanate and immediately pouring the mixture into a heated mold. The final curing was performed in an oven and held at 85° C. for 5 hours and overnight at 60° C. Each sample sheet was post cured for one week at room temperature before testing of its physical properties. Relative parameters were tested by referring to ASTM D412, ASTM D624 Die C, and using DSC, Shore type Durometers, a Brookfield viscometer, and an EJA Vantage-10 tensile tester and the results provided in Tables 8, 9, and 10.

TABLE 8

| | Comp. Ex. A1 | A2 | A3 | A4 |
|---|---|---|---|---|
| Krasol LBH 2000 LO | 100 | 75 | 50 | 0 |
| Polyfarnesene diol | 0 | 25 | 50 | 100 |
| 2-ethyl-1,3-hexanediol | 5.34 | 5.05 | 4.75 | 4.10 |

TABLE 8-continued

| | Comp. Ex. A1 | A2 | A3 | A4 |
|---|---|---|---|---|
| 2,4' Diphenylmethane Diisocyanate | 19.95 | 20.09 | 20.24 | 20.42 |
| 20% T-12 solution in DBP, drops | 4 | 4 | 4 | 4 |
| Hard segment content, wt % | 20.19 | 20.09 | 19.99 | 19.69 |
| Hardness of PU, Shore A | 54 | 47 | 38 | 55* |
| Tensile strength, psi | 337 | 267 | No data** | No data*** |
| Elongation at break, % | 885 | 680 | >1250 | No data*** |
| Modulus, psi | 109 | 95 | 41 | No data*** |
| Tear strength, lbf/in | 98 | 74 | 33 | No data*** |
| Tg of polyurethane product, ° C. | −28.3 | −33.4 | −39.8 | −51.2 |

55* the hardness was tested by type Shore 00 Durometer
No data** data could not be obtained due to specimen were not broken after strain was over 1200%
No data*** for sample A4, it is too soft and tacky to be tested

TABLE 9

| | Comp. Ex. B1 | B2 | B3 | B4 |
|---|---|---|---|---|
| Krasol LBH 2000 LO | 100 | 75 | 50 | 0 |
| Polyfarnesene diol | 0 | 25 | 50 | 100 |
| 2-ethyl-1,3-hexanediol | 11.87 | 11.58 | 11.28 | 10.81 |
| 2,4' Diphenylmethane Diisocyanate | 31.49 | 31.63 | 31.79 | 32.28 |
| 20% T-12 solution in DBP, drops | 4 | 5 | 5 | 4 |
| Hard segment content, wt % | 30.24 | 30.17 | 30.10 | 30.11 |
| Hardness of PU, Shore A | 72 | 66 | 60 | 55 |
| Tensile strength, psi | 1920 | 1029 | 742 | 572 |
| Elongation at break, % | 584 | 468 | 479 | 412 |
| Modulus, psi | 494 | 332 | 228 | 164 |
| Tear strength, lbf/in | 269 | 214 | 172 | 109 |
| Tg of polyurethane product, ° C. | −28.0 | −31.0 | −36.6 | −47.5 |

TABLE 10

| | Comp. Ex. C1 | C2 | C3 | C4 |
|---|---|---|---|---|
| Krasol LBH 2000 LO | 100 | 75 | 50 | 0 |
| Polyfarnesene diol | 0 | 25 | 50 | 100 |
| 2-ethyl-1,3-hexanediol | 20.19 | 19.89 | 19.59 | 19.01 |
| 2,4' Diphenylmethane Diisocyanate | 46.19 | 46.33 | 46.48 | 46.77 |
| 20% T-12 solution in DBP, drops | 4 | 5 | 5 | 4 |
| Hard segment content, wt % | 39.90 | 39.84 | 39.78 | 39.68 |
| Hardness of PU, Shore A | 83 | 75 | 73 | 71 |
| Tensile strength, psi | 2188 | 1350 | 1125 | 982 |
| Elongation at break, % | 491 | 291 | 328 | 347 |
| Modulus, psi | 860 | 681 | 527 | 378 |
| Tear strength, lbf/in | 392 | 332 | 280 | 174 |
| Tg of polyurethane product, ° C. | −26.6 | −29.9 | −33.0 | −45.9 |

While increased concentrations of polyfarnesene diol in the polyol blend resulted in lower hardness and tensile strength in the cured samples, the higher concentration of chain extender substantially improved the physical properties of all samples. Therefore, the appropriate selection of the type and amount of chain extender should provide a polyurethane prepolymer derived from a substantial amount of polyfarnesene diol with both improved viscosity prior to curing and adequate physical properties upon curing.

Tables 11 to 16 below provide data associated with the physical properties of polyurethane samples prepared using the two-shot method. Polyols and isocyantes were reacted together to a form a prepolymer at approximately 80° C. for about three hours followed by the addition of chain extenders, such that the final polyurethane had an NCO/OH ratio of approximately 1.0. The final curing was performed in an oven and held at 85° C. for 5 hours and overnight at 60° C.

For the samples of Examples D3-8, E3-8, and F3-8, polyfarnesene diol (Mw=5000) was evaluated having a higher molecular weight than the polyfarnesene diol (Mw=2000) of Examples G3-8, H3-8, and I3-8. Each sample sheet was post cured for one week at room temperature before testing of its physical properties. Relative parameters were tested by referring to ASTM D412, ASTM D624 Die C, and using DSC, Shore type Durometers, a Brookfield viscometer, and an EJA Vantage-10 tensile tester and the results provided in Tables 11 to 16.

TABLE 11

|  | Comp. Ex. | | Example | | Example | | Example | |
| --- | --- | --- | --- | --- | --- | --- | --- | --- |
|  | D1 | D2 | D3 | D4 | D5 | D6 | D7 | D8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 11.80 |  | 12.30 |  | 12.80 |  | 13.80 |  |
| 2,2,4-trimethyl-1,3-pentanediol |  | 11.80 |  | 12.30 |  | 12.80 |  | 13.80 |
| 2,4' Diphenylmethane Diisocyanate | 31.09 | 31.09 | 30.57 | 30.57 | 30.06 | 30.06 | 29.03 | 29.03 |
| 20% T-12 in DBP, drop | 3 | 3 | 3 | 3 | 3 | 3 | 3 | 3 |
| Shore A/D hardness | 73/28 | 76/31 | 72/30 | 74/30 | 71/27 | 71/27 | 55/16 | 49/12 |
| Tg, ° C. | −29.0 | −28.5 | −37.0 | −38.6 | −48.9 | −47.3 | −60.6 | −62.4 |
| Modulus, psi | 339 | 372 | 474 | 387 | 442 | 452 | 171 | 121 |
| Tensile strength, psi | 1136 | 675 | 1508 | 641 | 1507 | 816 | 657 | 447 |
| Elongation at break, % | 862 | 779 | 730 | 634 | 665 | 526 | 473 | 744 |
| Tear resistance, lbf/in | 238 | 205 | 275 | 213 | 248 | 212 | 121 | 104 |

TABLE 12

|  | Comp. Ex. | | Example | | Example | | Example | |
| --- | --- | --- | --- | --- | --- | --- | --- | --- |
|  | E1 | E2 | E3 | E4 | E5 | E6 | E7 | E8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 20.40 |  | 21.00 |  | 21.63 |  | 22.50 |  |
| 2,2,4-trimethyl-1,3-pentanediol |  | 20.40 |  | 21.00 |  | 21.63 |  | 22.50 |
| 2,4' Diphenylmethane Diisocyanate | 46.17 | 46.17 | 45.82 | 45.82 | 45.54 | 45.54 | 44.28 | 44.28 |
| 20% T-12 in DBP, drops | 3 | 3 | 3 | 3 | 3 | 3 | 3 | 3 |
| Shore A/D hardness | 91/48 | 91/44 | 87/42 | 86/40 | 82/38 | 83/35 | 66/21 | 63/18 |
| Tg, ° C. | −26.8 | −30.0 | −36.6 | −40.8 | −45.5 | −46.1 | −62.1 | −61.5 |
| Modulus, psi | 1163 | 1146 | 1118 | 1068 | 1043 | 977 | 387 | 323 |
| Tensile strength, psi | 2106 | 1347 | 1976 | 1345 | 1671 | 1191 | 602 | 520 |
| Elongation at break, % | 452 | 383 | 453 | 399 | 343 | 272 | 200 | 314 |
| Tear resistance, lbf/in | 464 | 378 | 404 | 369 | 351 | 283 | 116 | 110 |

TABLE 13

|  | Comp. Ex. | | Example | | Example | | Example | |
| --- | --- | --- | --- | --- | --- | --- | --- | --- |
|  | F1 | F2 | F3 | F4 | F5 | F6 | F7 | F8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 32.60 |  | 33.10 |  | 33.60 |  | 34.60 |  |
| 2,2,4-trimethyl-1,3-pentanediol |  | 32.60 |  | 33.10 |  | 33.60 |  | 34.60 |
| 2,4' Diphenylmethane Diisocyanate | 67.55 | 67.55 | 67.03 | 67.03 | 66.52 | 66.52 | 65.49 | 65.49 |
| 20% T-12 solution in DBP, drops | 3 | 3 | 3 | 3 | 3 | 3 | 3 | 3 |
| Shore A/D hardness | 95/58 | 96/57 | 92/52 | 94/48 | 82/39 | 89/42 | 72/19 | 68/18 |
| Tg, ° C. | −31.3 | −29.2 | −41.5 | −38.6 | −50.3 | −49.2 | −62.9 | −62.2 |
| Modulus, psi | 2160 | 2099 | 1841 | 1784 | 1581 | 1400 | 258 | No data |
| Tensile strength, psi | 3093 | 2207 | 2305 | 1851 | 1834 | 1449 | 262 | 242 |
| Elongation at break, % | 429 | 290 | 338 | 232 | 231 | 186 | 133 | 88 |
| Tear resistance, lbf/in | 627 | 561 | 498 | 463 | 362 | 283 | 80 | 64 |

TABLE 14

| | Comp. Ex. | | Example | | Example | | Example | |
|---|---|---|---|---|---|---|---|---|
| | G1 | G2 | G3 | G4 | G5 | G6 | G7 | G8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 11.80 | | 11.60 | | 11.40 | | 11.00 | |
| 2,2,4-trimethyl-1,3-pentanediol | | 11.80 | | 11.60 | | 11.40 | | 11.00 |
| 2,4' Diphenylmethane Diisocyanate | 31.09 | 31.09 | 31.29 | 31.29 | 31.51 | 31.51 | 31.91 | 31.91 |
| 20% T-12 in DBP, drops | 3 | 3 | 3 | 3 | 3 | 3 | 3 | 3 |
| Shore A/D hardness | 73/28 | 76/31 | 69/26 | 68/23 | 66/19 | 62/20 | 58/15 | 57/15 |
| Tg, ° C. | −29.0 | −28.5 | −32.6 | −33.5 | −38.8 | −37.3 | −55.5 | −49.7 |
| Modulus, psi | 339 | 372 | 320 | 274 | 219 | 212 | 98 | 68 |
| Tensile strength, psi | 1136 | 675 | 1267 | 635 | 1048 | 560 | 577 | 314 |
| Elongation at break, % | 862 | 779 | 833 | 728 | 939 | 760 | 903 | 866 |
| Tear resistance, lbf/in | 238 | 205 | 211 | 202 | 157 | 142 | 77 | 64 |

TABLE 15

| | Comp. Ex. | | Example | | Example | | Example | |
|---|---|---|---|---|---|---|---|---|
| | H1 | H2 | H3 | H4 | H5 | H6 | H7 | H8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 20.40 | | 20.20 | | 20.00 | | 19.60 | |
| 2,2,4-trimethyl-1,3-pentanediol | | 20.40 | | 20.20 | | 20.00 | | 19.60 |
| 2,4' Diphenylmethane Diisocyanate | 46.17 | 46.17 | 46.37 | 46.37 | 46.58 | 46.58 | 46.98 | 46.98 |
| 20% T-12 in DBP, drops | 3 | 3 | 3 | 3 | 3 | 3 | 3 | 3 |
| Shore A/D hardness | 91/48 | 91/44 | 88/41 | 88/40 | 82/36 | 88/39 | 84/35 | 84/37 |
| Tg, ° C. | −26.8 | −30.0 | −33.9 | −34.3 | −39.0 | −40.2 | −48.11 | −50.46 |
| Modulus, psi | 1163 | 1146 | 1059 | 1026 | 801 | 830 | 687 | 714 |
| Tensile strength, psi | 2106 | 1347 | 1869 | 1586 | 1659 | 1291 | 1477 | 1027 |
| Elongation at break, % | 452 | 383 | 460 | 490 | 548 | 483 | 514 | 396 |
| Tear resistance, lbf/in | 464 | 378 | 395 | 385 | 346 | 326 | 260 | 240 |

TABLE 16

| | Comp. Ex. | | Example | | Example | | Example | |
|---|---|---|---|---|---|---|---|---|
| | I1 | I2 | I3 | I4 | I5 | I6 | I7 | I8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 32.50 | | 32.30 | | 32.10 | | 31.70 | |
| 2,2,4-trimethyl-1,3-pentanediol | | 32.50 | | 32.30 | | 32.10 | | 31.70 |
| 2,4' Diphenylmethane Diisocyanate | 67.38 | 67.38 | 67.58 | 67.58 | 67.79 | 67.79 | 68.19 | 68.19 |
| 20% T-12 in DBP, drop | 3 | 3 | 3 | 3 | 3 | 3 | 3 | 3 |
| Shore A/D hardness | 95/58 | 96/57 | 92/49 | 95/53 | 95/48 | 85/48 | 96/55 | 95/52 |
| Tg, ° C. | −31.3 | −29.2 | −35.9 | −34.5 | −36.7 | −41.3 | −62.1 | −63.6 |
| Modulus, psi | 2160 | 2099 | 1955 | 1915 | 1824 | 1710 | 1623 | 1557 |
| Tensile strength, psi | 3093 | 2207 | 2415 | 2133 | 3230 | 1761 | 2355 | 1669 |
| Elongation at break, % | 429 | 290 | 314 | 280 | 425 | 235 | 329 | 203 |
| Tear resistance, lbf/in | 627 | 561 | 564 | 542 | 527 | 471 | 427 | 420 |

Similar to the samples obtained by the one-shot procedure, increased concentrations of polyfarnesene diol in the polyol blend resulted in lower hardness and tensile strength in the cured samples. The use of 2-ethyl-1,3-hexanediol instead of 2,2,4-trimethyl-1,3-pentanediol provided improved physical properties of all samples suggesting that the appropriate selection of the type and amount of chain extender may counter the effects of increasing the concentration of farnesene-based soft segments in the polyurethane.

B1, B2, B3, and B4 were prepared by the one shot procedure and had a hard segment content (chain extender plus diisocyanate) based on the total weight of the composition of about 30 wt %. G1, G3, G5, and G7 also had a hard segment content of about 30 wt %, but were produced by the two-shot method. G1, G3, G5, and G7 exhibited a slightly improved tensile strength. Increasing the hard segment content generally improved overall physical performance. For example, compare C1, C2, C3, and C4 with H1, H3, H5, and H7, which all have a hard segment content of about 40 wt. %.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A method of preparing a polyurethane comprising:
combining one or more polyols with one or more isocyanate-containing compounds having a isocyanate functionality of at least two to form a reaction mixture, and
curing the reaction mixture to produce a polyurethane which has a backbone derived from monomers comprising farnesene,
wherein at least one of the one or more polyols is a farnesene-based polyol which is a polyol of a farnesene homopolymer or a polyol of a copolymer of farnesene and a comonomer selected from the group consisting of dienes, vinyl aromatics, and combinations thereof, the farnesene-based polyol being a polymer having a backbone derived from monomers comprising farnesene and at least one terminal end comprising a hydroxyl group.

2. The method of claim 1, further comprising combining the one or more polyols and one or more isocyanate-containing compounds with a chain extender.

3. The method of claim 1, wherein the chain extender is selected from the group consisting of monomeric polyols and polyamines.

4. The method of claim 1, wherein the chain extender is selected from the group consisting of 1,4-butanediol, 1,6-hexanediol, ethylene glycol, 2-ethyl-1,3-hexanediol (EHD), 2-butyl-2-ethyl-1,3-propanediol (BEPG), 2,2,4-trimethyl-1,3-pentanediol (TMPD), 2,4-deithyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMGDAB), 4,4'-methylene-bis(3-chloro-2,6-diethylaniline) (M-CDEA), N,N'-bis(sec-butyl)methylene-dianiline (SBMDA), and mixtures thereof.

5. The method of claim 1, wherein the farnesene-based polyol is a polyol of a copolymer of farnesene and one or more monomers selected from the group consisting of dienes, vinyl aromatics, and combinations thereof.

6. The method of claim 5, wherein the dienes are selected from the group consisting of butadiene and isoprene.

7. The method of claim 5, wherein the vinyl aromatics are selected from the group consisting of styrene and alpha methyl styrene.

8. The method of claim 1, wherein the one or more isocyanate-containing compounds are selected from the group consisting of 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and combinations thereof.

9. The method of claim 1, wherein the farnesene-based polyol has been hydrogenated to have a degree of unsaturation less than or equal to 50% of the degree of unsaturation of the farnesene-based polyol prior to hydrogenation.

10. The method of claim 1, wherein the farnesene-based polyol has been hydrogenated to have a degree of unsaturation less than or equal to 10% of the degree of unsaturation of the farnesene-based polyol prior to hydrogenation.

11. The method of claim 1, wherein the method comprises forming a prepolymer by reacting the one or more polyols with the one or more isocyanate-containing compounds.

12. The method of claim 11, additionally comprising chain-extending the prepolymer with one or more chain extenders.

13. The method of claim 12, wherein the method comprises combining the one or more polyols, the one or more isocyanate-containing compounds, and, optionally, one or more chain extenders generally simultaneously into a common reaction vessel to form the reaction mixture.

14. The method of claim 1, wherein the curing comprises a hot air post-cure for up to twenty-four hours at 25° C. to about 200° C.

15. The method of claim 1, wherein curing is accelerated using a catalyst.

* * * * *